United States Patent
Hamada et al.

[11] Patent Number: 6,135,598
[45] Date of Patent: Oct. 24, 2000

[54] OPTICAL DEVICE WITH LIGHT PATH CHANGING ELEMENT AND PROJECTION-TYPE DISPLAY APPARATUS

[75] Inventors: Tetsuya Hamada; Keiji Hayashi; Toshihiro Suzuki, all of Kawaski, Japan

[73] Assignee: Fujitsu Limited, Kawasaki, Japan

[21] Appl. No.: 09/268,374

[22] Filed: Mar. 15, 1999

[30] Foreign Application Priority Data

Jul. 8, 1998 [JP] Japan .................................. 10-192777

[51] Int. Cl.[7] ....................................... B03B 21/14
[52] U.S. Cl. ................... 353/38; 353/81; 362/308
[58] Field of Search ................... 353/38, 20, 81, 353/102, 98; 362/299, 305, 337, 339, 328, 308

[56] References Cited

U.S. PATENT DOCUMENTS

| | | | |
|---|---|---|---|
| 5,005,968 | 4/1991 | Tejima et al. | 353/38 |
| 5,250,967 | 10/1993 | Miyashita | 353/38 |
| 5,580,144 | 12/1996 | Stroomer | 353/38 |
| 5,617,152 | 4/1997 | Stolov | 353/81 |
| 5,808,759 | 9/1998 | Okamori et al. | 362/308 |
| 5,844,638 | 9/1998 | Ooi et al. | 362/308 |
| 5,938,307 | 8/1999 | Hamada et al. | 353/81 |

FOREIGN PATENT DOCUMENTS

| | | |
|---|---|---|
| 6175129 | 6/1994 | Japan . |
| 6342158 | 12/1994 | Japan . |
| 7294920 | 11/1995 | Japan . |
| 9120047 | 5/1997 | Japan . |

*Primary Examiner*—William Dowling
*Attorney, Agent, or Firm*—Greer, Burns & Crain, Ltd.

[57] ABSTRACT

A projection-type display apparatus includes a light source, a liquid crystal panel, and a light path changing element arranged between the light source and the liquid crystal panel for changing a light path so that a light beam emitted by the light source and going to the central portion of the liquid crystal panel is bent toward the peripheral portion of the liquid crystal panel. Therefore, a uniform illuminance distribution and a uniform color distribution are ensured.

15 Claims, 14 Drawing Sheets

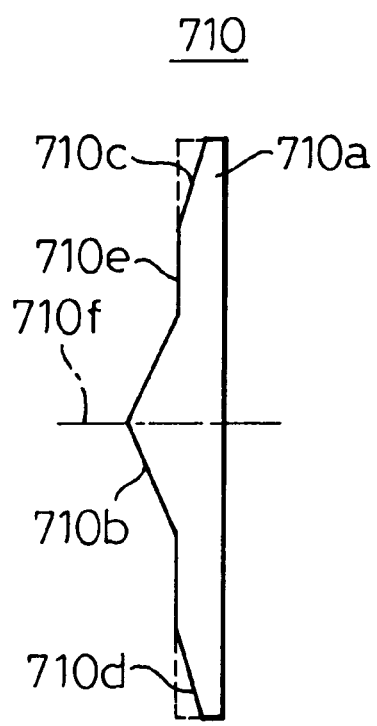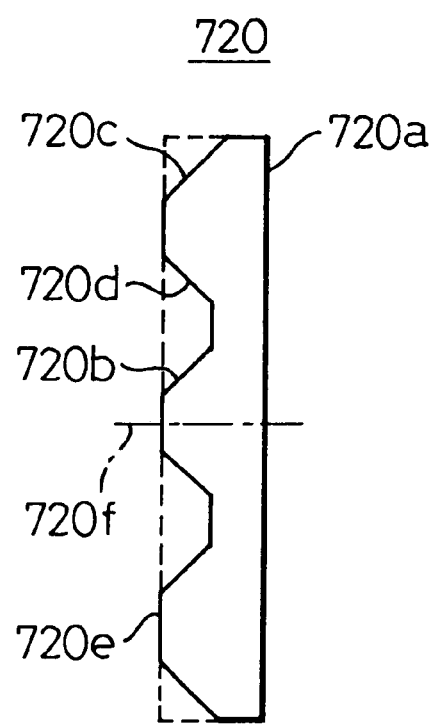

OPTICAL DEVICE WITH LIGHT PATH CHANGING ELEMENT AND PROJECTION-TYPE DISPLAY APPARATUS

BACKGROUND OF THE INVENTION

1. Field of the Invention

The present invention relates to an optical device and a projection-type display apparatus and, in particular, to an optical device capable of irradiating an object with a light from a light source, while assuring a uniform illuminance distribution and a uniform color distribution on the surface of the object, and a projection-type display apparatus for irradiating a light modulation element with light from a light source and projecting the light modulated by the light modulation element onto a screen as an enlarged image.

2. Description of the Related Art

There are conventional projection-type liquid crystal display apparatuses using a transmission-type liquid crystal panel.

FIG. 19 in the attached drawings shows a conventional projection-type liquid crystal display apparatus.

The projection-type liquid crystal display apparatus 80 is a three-plate system apparatus in which a white light is separated into three primary color light beams. The beams are a red light beam (R light or R), a green light beam (G light or G) and a blue light beam (B light or B), and after modulating the three light beams, the three light beams are combined and the combined modulated light is projected. This projection-type liquid crystal display apparatus 80 comprises a light source 81 emitting a white light, a UV/IR cut filter 82 for removing the ultraviolet light component and the infrared light component of the white light, a GR reflection dichroic mirror 83 for reflecting the green light and the red light and allowing the blue light to pass through, R reflection dichroic mirrors 84A and 84B for reflecting the red light and allowing the green light and the blue light to pass through, total reflection mirrors 85A and 85B, a BR reflection dichroic mirror 86 for reflecting the blue light and the red light and allowing the green light to pass through, condenser lenses 87R, 87G and 87B, liquid crystal panels 88R, 88G and 88B for modulating respective color light beams, and a projection lens 89.

A halogen lamp or a metal halide lamp is used as the light source 81. The white light emitted from the light source 81 enters the UV/IR cut filter 82 where the ultraviolet light component and the infrared light component are removed, after which the blue light is transmitted through the GR reflection dichroic mirror 83, while the red light and the green light are reflected and the light path thereof changes by 90°. The light path of the blue light is changed by 90° by the total reflection mirror 85A, and after being condensed by the condenser lens 87B, enters the liquid crystal panel 88B. The blue light is modulated in accordance with image signals by the liquid crystal panel 88B, and the modulated blue light exits from the liquid crystal panel 88B. The modulated blue light is reflected by the BR reflection dichroic mirror 86 and, after the light path thereof is changed by 90°, proceeds toward the projection lens 89.

The red light in the green light and the red light reflected by the GR reflection dichroic mirror 83 is reflected by the R reflection dichroic mirror 84A and the light path thereof is changed by 90° while the green light is transmitted through it. The reflected red light is condensed by the condenser lens 87R before entering the liquid crystal panel 88R. The red light is modulated by the liquid crystal panel 88R in accordance with image signals, and the modulated red light exits from the liquid crystal panel 88R. The modulated red light is reflected by the R reflection dichroic mirror 84B and the light path thereof is changed by 90°, while at the same time being combined with the blue light. The resulting light is reflected by the BR reflection dichroic mirror 86 and, after the light path thereof is changed by 90°, proceeds toward the projection lens 89.

The green light transmitting through the R reflection dichroic mirror 84R is condensed by the condenser lens 87G before entering the liquid crystal panel 88G. The green light is modulated by the liquid crystal panel 88G in accordance with image signals, and the modulated green light exits from the liquid crystal panel 88G. The modulated green light, after changing its light path by 90° at the total reflection mirror 85B, is transmitted through the BR reflection dichroic mirror 86 to be combined with the blue light and the red light, and proceeds to the projection lens 89.

The combined light that has entered the projection lens 89 is projected to a screen, not shown, thereby forming an image on the screen.

By the way, the condenser lenses 87R, 87G and 87B arranged adjacent to the liquid crystal panels 88R, 88G and 88B, respectively, assure that the modulated light that has left each liquid crystal panel enters the projection lens 89 efficiently.

FIG. 20 shows a light source used for the projection-type liquid crystal display apparatus described above.

As shown in FIG. 20, the light source 81 is configured of a light-emitting unit (arc) 92 and a reflector 91 for reflecting the light from the light-emitting unit 92 in a predetermined direction.

Also, in the case where the light source 81 is a discharge lamp of a DC energization type, an anode 93 and a cathode 94 are arranged in opposed relationship to each other on the optical axis in the light-emitting unit 92.

When the light source 81 of this configuration is used, the illuminance distribution on the surface of each of the liquid crystal panels 88 (R, G, B) which is irradiated with the light from the light source 81 is such that the illuminance is highest at the central portion of the surface and progressively decreases toward the peripheral portion.

Also, in the projection optical system of the conventional projection-type liquid crystal display apparatus 80, the transmittance characteristic of the projection lens 89 is such that the transmittance is highest in the neighborhood of the optical axis of the lens and tends to progressively decrease toward the peripheral portion.

As a result of these two factors being combined, the image projected on the screen is bright at the central portion of the screen but becomes darker toward the peripheral portion, thereby leading to the problem that the illuminance distribution becomes uneven.

Also, in the case where the light source 81 is a lamp of a DC energization type or the like which has a color distribution in the light-emitting unit 92, the color is distributed on each of the surfaces of the liquid crystal panels 88 (R, G, B) which is irradiated with the light from the light source 81, resulting in the problem that the color distribution of the image projected on the screen becomes uneven at the central portion and the peripheral portion of the screen.

Specifically, if it is assumed, for example, that the side of the anode 93 includes a blue component and the side of the cathode 94 includes a yellow component in the light-emitting unit 92 of the light source 81, in the light paths of the light rays reflected at the same point of the reflector 91, the light ray Lc exiting from the cathode side indicated by dashed line is reflected toward the optical axis and illuminates the optical axis side, i.e. the central portion of the radiation surface. The light La exiting from the anode side indicated by the solid line, on the other hand, is reflected in the direction away from the optical axis and illuminates the peripheral portion of the radiation surface.

Consequently, the image projected on the screen becomes yellowish at the central portion of the screen near the optical axis, and bluish at the peripheral portion. As described above, in the conventional projection-type display apparatus, the problem is that the illuminance distribution and the color distribution of the image projected on the screen become uneven.

SUMMARY OF THE INVENTION

The object of the present invention, therefore, is to realize an optical device in which the illuminance distribution and the color distribution on an illuminated surface are uniform with a higher illuminance, and a projection-type display apparatus in which the illuminance distribution and the color distribution are uniform with a bright projected image.

An optical device, according to the present invention, is provided to irradiate a surface of an object with a light. The device comprises a light source, and a light path changing element arranged between the light source and the object for changing a light path along which a part of a light ray emitted by the light source travels toward a central portion of the surface of the object into a light path along which said part of the light ray travels toward a peripheral portion of the surface of the object, without changing the parallelism of the light ray.

Further, a projection-type display apparatus, according to the present invention, comprises a light source, at least one light modulation element for modulating the light emitted by the light source, a projection lens for projecting the modulated light, and a light path changing element interposed between the light source and the light modulation element for changing a light path along which a part of a light ray emitted by the light source travels toward a central portion of a display area of the light modulation element into a light path along which said part of the light ray travels toward a peripheral portion of the display area, without changing parallelism of the light ray.

BRIEF DESCRIPTION OF THE DRAWINGS

The present invention will become more apparent from the following description of the preferred embodiments, with reference to the accompanying drawings, in which:

FIGS. 18A and 18B are view illustrating further examples of the light path changing element;

DESCRIPTION OF THE PREFERRED EMBODIMENTS

The present invention will be now described with reference to the preferred embodiments.

Figure 1A:
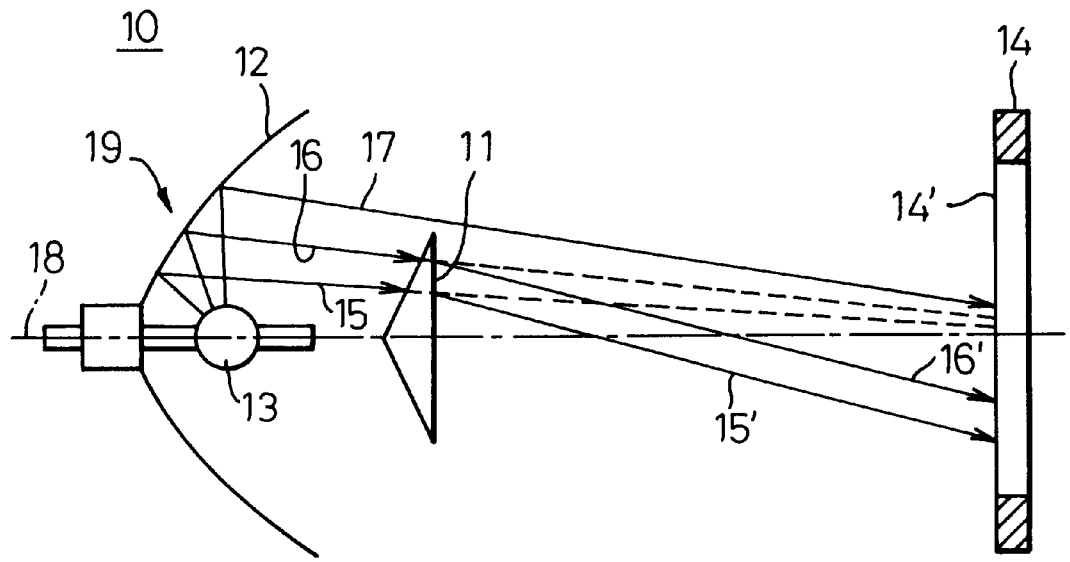
FIG. 1A is a view illustrating the first example of the principle of the present invention.

FIG. 1A shows the first example of the optical device according to the principle of the present invention.

An optical device 10 according to the present invention, shown in FIG. 1A, comprises a light source 19 and a light path changing element 11. The light source 19 is configured of a reflector 12 and a light emitting unit 13, and the light path changing element 11 is interposed between the light source 19 and an object 14 to be irradiated. There are light beams 15 to 17 emitted from the light-emitting unit 13 and reflected by the reflector 12 which travel toward the central portion of a surface 14' of the object 14 to be irradiated in the neighborhood of the optical axis. The light path changing element 11 changes a light path of the light beams 15 and 16, located near the optical axis, which are a part of the light beams 15 to 17, into a light path of the light beams 15' and 16', which cross the optical axis and travel toward the peripheral portion of the surface 14' while maintaining parallelism of the light beam, i.e., without divergence or convergence the light beam.

As a result, the light beam that should otherwise irradiate the central portion of the surface of the object 14 is directed to the peripheral portion of the surface of the object 14, so that the illuminance of the peripheral portion is improved to assure a uniform illuminance distribution over the surface of the object 14. Further, even in the case where an uneven color distribution should otherwise occur on the surface of the object 14, the positions are exchanged with respect to the optical axis, and therefore a color appearing on the surface of the object 14 near the optical axis is mixed with a color appearing on the surface of the object 14 remote from the peripheral portion to thereby assure a uniform color distribution, since the light ray crosses the optical axis so that the position of the light ray located remote from the optical axis on the light path changing element 11 shifts to the position of the light ray located remote from the optical axis on the surface of the object 14, while the position of light ray located remote from the optical axis on the light path changing element 11 shifts to the position of the light ray located near the optical axis on the surface of the object 14.

Figure 1B:
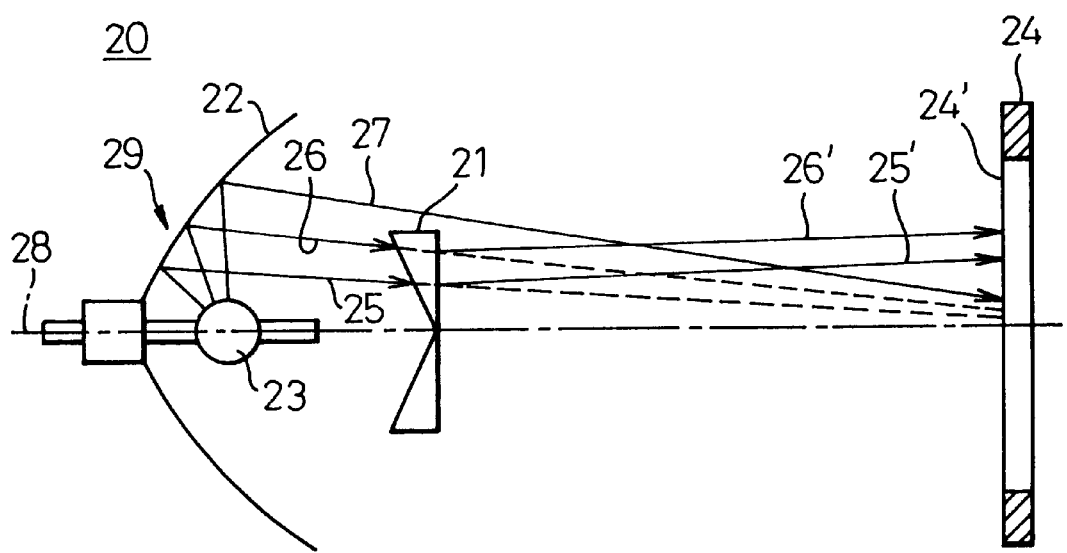
FIG. 1B is a view illustrating the second example of the principle of the present invention.

Also, the optical device 20, according to the present invention, shown in FIG. 1B comprises a light source 29 and a light path changing element 21. The light source 29 is configured of a reflector 22 and a light emitting unit 23, and a light path changing element 21 is arranged between the light source 29 and an object 24 to be irradiated. There are light beams 25 to 27 emitted from the light-emitting unit 23 and reflected by the reflector 22 which travel toward the central portion of the surface 24' of the object 24 in the neighborhood of the optical axis. The light path changing element 21 changes a light path of the light beams 25 and 26, which are part of the light beams 25 to 27, into a light path of the light beams 25' and 26' in the direction away from the optical axis, while maintaining parallelism of the light ray, i.e., without divergence or convergence of the light ray.

Consequently, the light that should otherwise irradiate the central portion of the surface of the object 14 is directed to the peripheral portion of the object 14 so that the illuminance of the peripheral portion is increased to assure a uniform illuminance. Further, even in the case where an uneven color distribution should otherwise occur on the surface of the object 14, the light ray that should otherwise proceed to the central portion of the surface of the object 14 is directed to the peripheral portion of the object and the colors are mixed at the peripheral portion so that the color distribution is equalized. As to the equalization of the illuminance distribution, the optical device 10 of FIG. 1A and the optical device 20 of FIG. 1B have substantially similar function and effect. As for the equalization of the color distribution, however, the optical device 10 is more advantageous than the optical device 20.

Specifically, in the optical device 20, the light path of the light ray that should otherwise irradiate the central portion of the surface 24' of the object 24 is simply changed to a light path proceeding to the peripheral portion on the same side of the optical axis 28 by the light path changing element 21, and there is no light ray mixed at the central portion of the surface 24'. In the optical device 10, in contrast, the light ray is rendered to cross the optical axis, i.e. the light path is changed to proceed to the other side of the optical axis, so that the light rays located inside with respect to the optical axis 18 are replaced with the light ray located outside with respect to the optical axis, and therefore the light ray that should otherwise irradiate the peripheral portion can be mixed at the central portion of the surface 14'.

The configuration, the principle and the operation of the optical device 10 and 20 according to the present invention are shown in FIGS. 1A and 1B. The optical device 10 and 20 of FIGS. 1A and 1B, in which the objects 14 and 24 are made up of light modulation elements and a projection lens is included for projecting the modulated light transmitting through the light modulation element, can realize a projection-type display apparatus according to this invention, whose principle and operation are similar to those described above.

Specifically, the illuminance distribution and the color distribution of the light rays entering the light modulation element are equalized, so that the illuminance distribution and the color distribution of the projected image are equalized, thereby producing a superior projected image.

Figure 2:
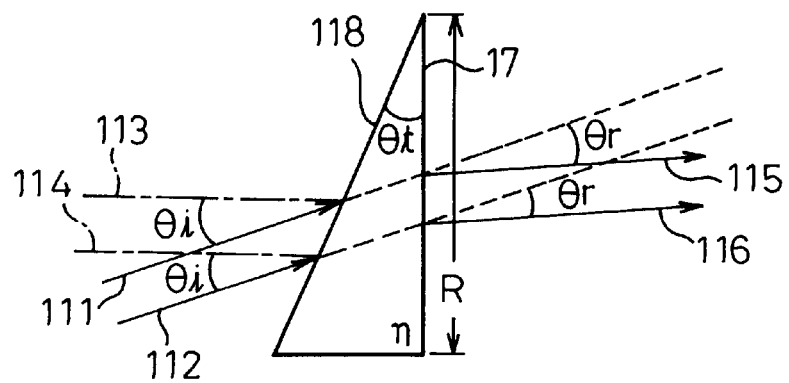
FIG. 2 is a view illustrating the operation of a prism constituting the light path changing element shown in FIGS. 1A and 1B.

Also, FIG. 2 shows the construction and the operation of a prism constituting the light path changing elements 11 and 21 shown in FIGS. 1A and 1B, which will be explained with reference to a prism 110.

The prism 110 has a right triangular cross-section having a flat exiting surface 117, a flat incidence surface 118, and an apex angle $\theta t$ formed by the exit surface 117 and the incidence surface 118, and the prism length is R. In the prism 110, the light ray 111 and 112 enters the incidence surface 118 at an angle $\theta i$ to the normals 113 and 114 to the exit surface 117 and is emitted from the exit surface 117 with the light path thereof changed by an angle $\theta r$ with respect to the direction of incidence of the light ray 111 and 112. The angle $\theta r$ is given by the following relationship:

$$\theta r = \sin^{-1}(n \cdot \sin \theta t) - \theta t$$

where n is the refractive index of the material constituting the prism 110.

Also, as shown, in the prism 110, the light beams 111 and 112 that enter the prism 110 at the same angle are emitted with the light paths thereof changed by the same angle. Specifically, the light paths are changed while maintaining the parallelism of the light beams.

Considering now two light rays, when two light rays entering the prism 110 are parallel to each other (light rays 111 and 112 in FIG. 2), two light rays exiting from the prism 110 are also parallel to each other (light rays 115 and 116 in FIG. 2). In the case where two light rays entering the prism 110 form an angle of $\theta o$, on the other hand, two light rays exiting from the prism 110 also form the angle $\theta o$.

As described above, the prism 110 does not change the parallelism of the light rays (light fluxes) entering it, and therefore does not diverge or converge the parallel light rays. In other words, in the case where parallel light rays enter the prism, they exit as parallel light rays without spreading.

Now, assume that the prism has the function of diverging or converging the light rays entering it, i.e. that the incidence surface or the exit surface of the prism is configured of a curve or the like. The light rays that enter the prism as parallel light rays exit with a spread angle. As a result, all the light rays with the light paths thereof changed by the prism may be unable to enter the surface of the object, and some light rays may become useless. In such a case, the light rays from the light source cannot be effectively utilized and the illuminance is reduced.

Assume that an attempt is made to use a prism having the function of divergence and convergence in such a manner not to cause useless light rays as described above. The angle at which the light path is changed in the prism 110, i.e. the apex angle $\theta t$ of the prism 110 may be limited. In such a case, sufficient light rays cannot be directed to the peripheral portion of the surface, resulting in an insufficient equalization of the illuminance distribution or the color distribution. Even when all the light rays enter the surface, the light rays that transmit through a liquid crystal panel (the object to be irradiated, i.e. a light modulation element) of the projection-type liquid crystal display apparatus described above may be unable to enter the projection lens.

As described above, the configuration in which the incident light rays are diverged or converged poses the problem of a reduced illuminance, or insufficient equalization of the illuminance distribution or color distribution. With the prism 110 according to this invention described above, in contrast, the incident light rays exit while substantially maintaining the parallelism without divergence or convergence, and the problem described above is not posed.

The foregoing description was made with reference to a prism having a right angular cross-section as shown in FIG. 2 which is the simplest unit of configuration. Nevertheless, the shape of the light path changing element embodying the present invention is not limited to such a prism but, as shown in the embodiments that follow, a similar operation and effect can be obtained from the essential parts of a configuration comprising a plurality of prism units combined or a configuration in which a prism is integrated with a transparent base.

Figure 3:
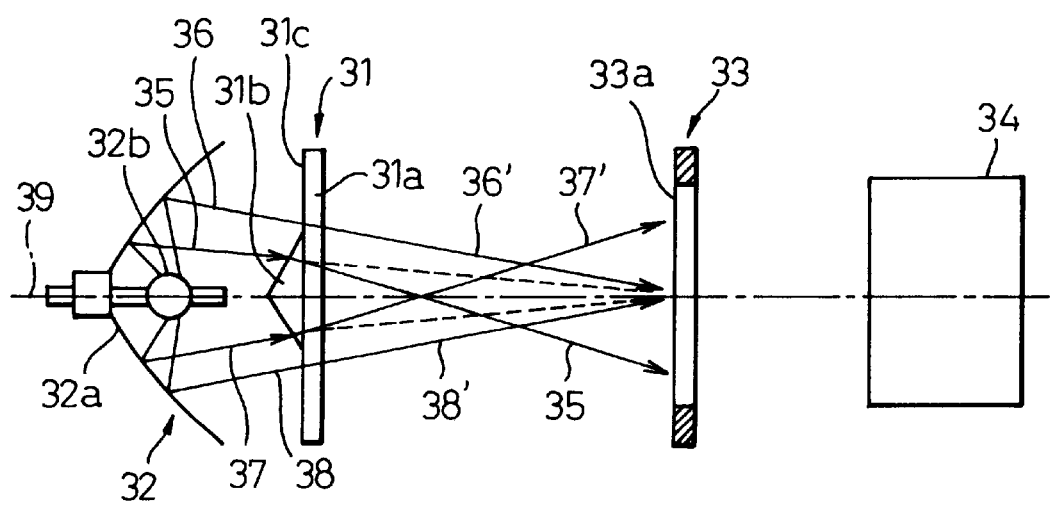
FIG. 3 is a view illustrating the projection-type display apparatus according to the first embodiment of the present invention.

FIG. 3 shows a configuration of a projection-type display apparatus (optical device) according to the first embodiment of the present invention.

The projection-type display apparatus 30 comprises a light source 32 including a reflector 32a and a light-emitting unit 32b, a liquid crystal panel 33 constituting an object to be irradiated and a light modulation element at the same time, a light path changing element 31 arranged between the light source 32 and the liquid crystal panel 33, and a projection lens 34. Also, the light source 32 and the light path changing element 31 make up an optical device according to the present invention.

A well-known transmission-type liquid crystal panel can be used as the liquid crystal panel 33 constituting a light modulation element (object to be irradiated) and a light ray emitted from the light source 32 and transmitted through the light path changing element 31 enters the liquid crystal panel 33. The incident light ray is modulated by the liquid crystal panel 33, and the modulated light ray is projected onto a screen, not shown, by the projection lens 34 and forms an image.

The light path changing element 31 includes a light ray incidence surface 31c and a portion with a central portion thereof protruding toward the light ray incidence side. For example, a transparent base 31a made of a transparent material such as glass or plastic resin has a conical prism 31b arranged thereon on the side of the light ray incidence surface 31c thereof and made of a transparent material. The transparent base 31a and the prism 31b are bonded with an adhesive. The transparent base 31a, the prism 31b and the adhesive are configured of materials having substantially the same refractive index. Also, the light ray from the light source 32 is adapted to enter the side of the transparent base 31 on which the prism 31b is provided.

The light-emitting unit 32b of the light source 32 is a discharge-type light-emitting tube having a pair of internal electrodes arranged in an opposed relationship to each other on the optical axis. Also, the light source 32 is a discharge lamp of a DC energization type in which an electrode in the neighborhood of the apex of the reflector 32a is an anode, and the other electrode in opposed relationship to the anode is a cathode.

The light emitted from the light-emitting unit 32b is reflected by the reflector 32a and exits from the light source 32. The light path of a part of the light ray which exits from the light source 32 and travels to the central portion of the surface 33a constituting the display area of the liquid crystal panel 33 is changed by the light path changing element 31.

Specifically, the light beams 35 and 37 having light paths proceeding to the central portion of the surface 33a enter the prism 31b of the light path changing element 31, and have the light paths thereof changed to cross the optical axis into light beams 35' and 37', and thus reach the peripheral portion of the surface 33a on the opposite side of the optical axis 39. On the other hand, the light beams 36 and 38 similarly having light paths proceeding to the central portion of the surface 31 transmit through the transparent base 31a of the light path changing element 31 and reach the central portion of the surface 33a as they are.

As a result, in the projection-type display apparatus 30, the light ray emitted from the light source 32 and irradiated onto the surface 33a of the liquid crystal panel 33 has a uniform illuminance distribution and a uniform color distribution. Thus, the image projected on the screen (not shown) by the projection-type display apparatus 30 is a superior image having a uniform brightness free of color irregularities.

Figure 4A:
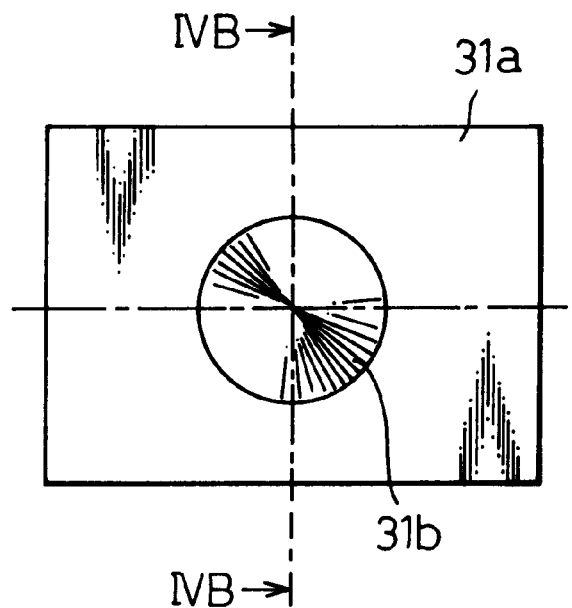
FIGS. 4A and 4B are views illustrating the light path changing element shown in FIG. 3.
Figure 4B:
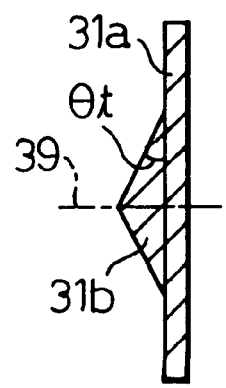

FIGS. 4A and 4B shows the light path changing element 31 in FIG. 3. FIG. 4A is a plan view, and FIG. 4B is a cross-sectional view taken along the line IVB—IVB in FIG. 4A. The same component members are designated by the same reference numerals, respectively, in the drawings that follow and a detailed description will be omitted.

As shown in FIGS. 4A and 4B, the transparent base 31a is made of a material such as borosilicate glass and is a flat rectangular plate having a longitudinal side of 8 cm, a transverse side of 10 cm, and a thickness of 2 mm. This transparent base 31a has a shape substantially similar to that of the surface 33a constituting the display area of the liquid crystal panel 33, and has a size covering substantially the entire light path of the light beam emitted from the light source 32 at the position where the light changing element 31 is arranged. The prism 31b is conical in shape and is arranged at the central portion of the transparent base 31a so that the apex thereof lies on the optical axis 39 and the bottom surface thereof is perpendicular to the optical axis 39. Also, the prism is made of a transparent material such as borosilicate, and has the cross-sectional taper angle θt of 4° and a bottom diameter of 4 cm. Further, the transparent base 31a and the prism 31b are optically bonded to each other by an adhesive in such a manner that there is substantially no loss by reflection at the interface between the transparent base 31a and the prism 31b or the interface between the prism 31b and the adhesive or by absorption in the adhesive layer.

The shape and size of the prism 31b are designed after taking into consideration various factors including the material of the prism 31b and the illuminance distribution and the color distribution required for the surface. The angle at which the light paths are changed by the prism 31b, for example, can be set to 3° to 7°. Also, generally, the larger the prism 31a (the longer the bottom diameter, i.e. the longer the prism length R (see FIG. 2)), or the larger the taper angle (i.e. the larger the angle θt (see FIG. 2)), the higher the effect of changing the light paths to the peripheral portion, so that the central illuminance is reduced and the peripheral illuminance is increased.

Figure 5A:
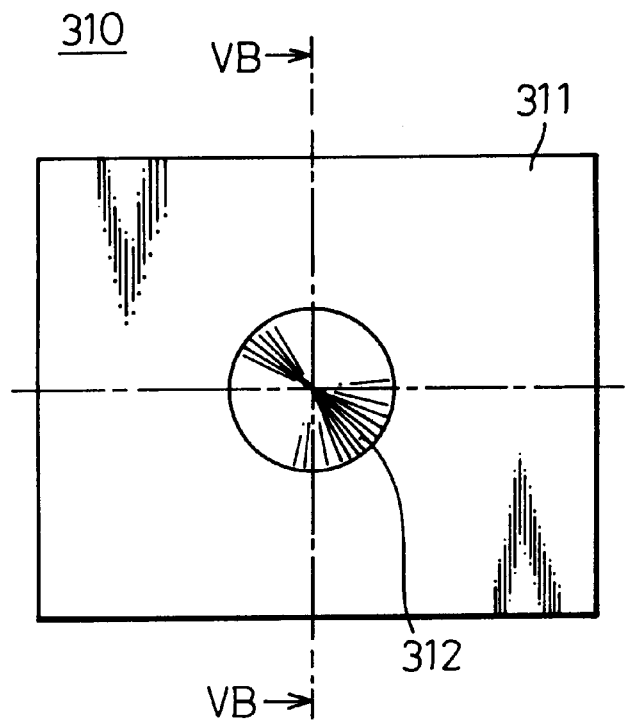
FIGS. 5A and 5B are views illustrating another example of the light path changing element.
Figure 5B:
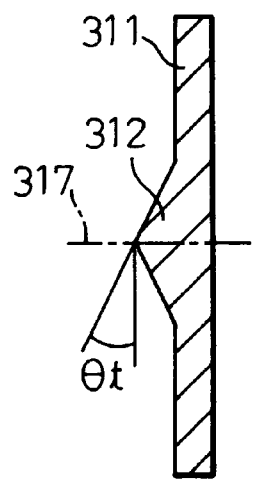

FIGS. 5A and 5B show another example of the light path changing element. FIG. 5A is a plan view, and FIG. 5B a cross-sectional view taken along the line VB—VB in FIG. 5A.

The light path changing element 310 shown in FIGS. 5A and 5B is arranged in place of the light path changing element 31 making up the projection-type display apparatus 30 shown in FIG. 3, and will also be explained with reference to FIG. 3.

The light path changing element 310 comprises a transparent base 311 and a prism 312 integrally formed with each other. The transparent base 311 and the prism 312 are made of borosilicate glass or the like material. The transparent base 311 is a flat rectangular plate having an outline having a longitudinal side of 8 cm, a transverse side of 10 cm and a thickness of 2 mm, and a shape substantially similar to that of the surface 33a constituting the display area of the liquid crystal panel 33. Also, at the position where the light path changing element 310 is arranged, the transparent base 311 has a size sufficient to cover substantially the whole range of the light paths of the light ray emitted from the light source 32. The prism 312 is conical in shape, and is located at the central portion of the transparent base 311 so that the apex thereof is located on the optical axis 313 (corresponding to the optical axis 39 of FIG. 3). The prism 312, like the transparent base 11, is made of borosilicate glass or the like material, has a cross-sectional taper angle θt of 4° and a bottom diameter of 4 cm. Also, the light ray from the light source 32 is adapted to first enter the prism 312 of the light path changing element 310.

The light path changing element 310 shown in FIG. 5A and 5B can be easily formed in press or the like, and is superior in production efficiency to the light path changing element 31 of FIGS. 4A and 4B. Also, the fact that it can be integrally molded poses no problem of the loss which was taken into consideration for the light path changing element 31 of FIGS. 4A and 4B.

Figure 6A:
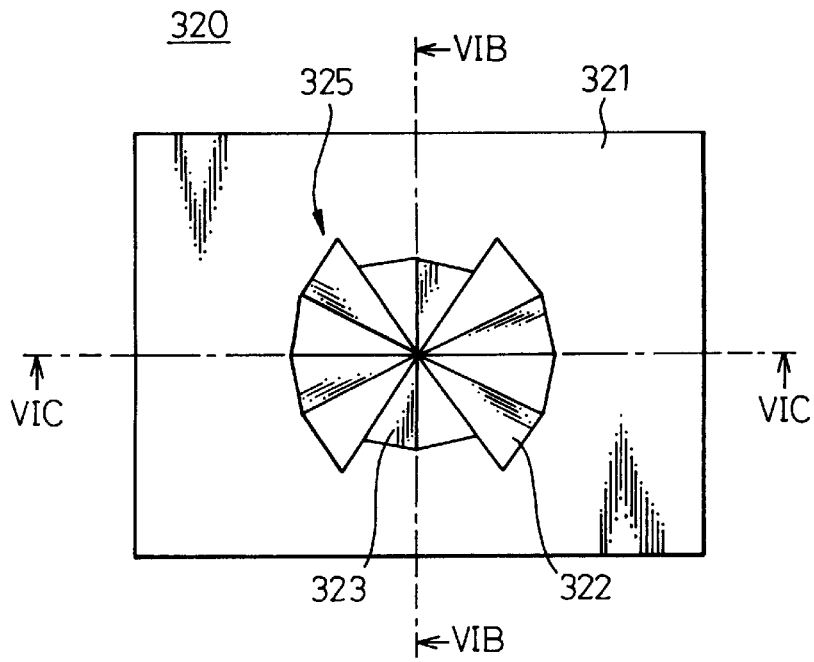
FIGS. 6A to 6C are views illustrating a further example of the light path changing element.
Figure 6B:
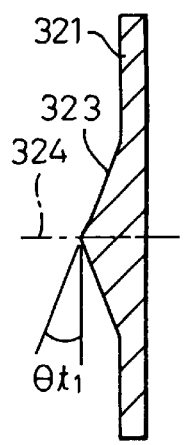
Figure 6C:
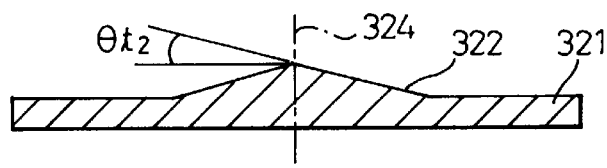

FIGS. 6A to 6C show a further example of a light path changing element according, FIG. 6A is a plan view, FIG. 6B is a cross-sectional view taken along the line VIB—VIB.

The light path changing element 320 shown in FIGS. 6A to 6C is arranged in place of the light path changing element 31 making up the projection-type display apparatus 30 shown in FIG. 3, like the light path changing element 310 shown in FIGS. 5A and 5B.

The light path changing element 320 shown in FIGS. 6A to 6C is identical to the light path changing element 310 of FIGS. 5A and 5B, in that the transparent base 321 and the prism 325 are integrally formed.

The prism 325 of the light path changing element 320 is similar in shape to a polygonal conical prism. This prism 325 is shaped as a combination of a multiplicity of prisms, or in other words, as a combination of sections of a plurality of polygonal conical prisms of different prism lengths, different apexes and different taper angles.

In the prism 325 shown in FIG. 6B, a part of the polygonal conical prism is configured of the prism surface 323 having a taper angle θt1 in the cross-section taken along the line VIB—VIB. These parts of prism are arranged on either side of the vertical line VIB—VIB passing through the optical axis and symmetrically about the horizontal line VIC—VIC passing through the optical axis.

Also, as shown in FIG. 6C, a part of the polygonal conical prism configured of a prism surface 322 having a taper angle θt2 in the cross-section taken along the line VIC—VIC is arranged. These parts are arranged on either on side of the horizontal line VIC—VIC and symmetrically about the vertical line VIB—VIB passing through the optical axis.

In this case, the taper angles θt1 and θt2 have a relationship such that θt1 is larger than θt2, and the length of the prism configured of the prism surface 322 is longer than that for the prism configured of the prism surface 323. Also, the apexes of the respective polygonal cones merge on the optical axis 324.

As a result, the prism part 325 has an almost rectangular shape and is similar to the shape of the surface of the liquid crystal panel constituting the object to be irradiated, i.e. the shape of the display area having an approximate aspect ratio of 3:4. As a result, the illuminance distribution or the color distribution can be equalized in accordance with the display area of the liquid crystal panel constituting the radiation surface. In the example shown in FIGS. 6A to 6C, two types of prisms are combined. By combining more shapes of prisms, a prism having an aspect ratio nearer to 3:4 can be obtained.

As described above, the prism is configured of a plurality of types of prism shapes having different taper angles and prism lengths, so that the illuminance distribution or the color distribution can be equalized in accordance with an arbitrary desired shape of the radiation surface, etc. It is also possible to realize an aspect ratio of 9:16, for example.

Figure 7:
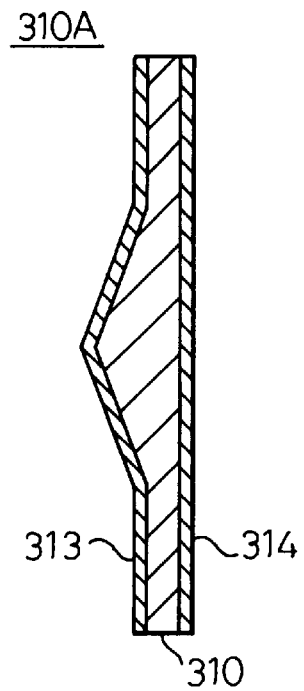
FIG. 7 is a view illustrating a further example of the light path changing element.

FIG. 7 shows a further example of a light path changing element according to the invention. The light path changing element 310A shown in FIG. 7 is arranged in place of the light path changing element 31 making up the projection-type display apparatus 30 shown in FIG. 3.

The light path changing element 310A includes anti-reflection films formed on the surfaces of the light path changing element 310 shown in FIGS. 5A and 5B. Anti-reflection films 313 and 314 are formed on the incidence surface side and the exit surface side of the light path changing element 310. A well-known anti-reflection film in general use with optical products can be used as the antireflection films 313 and 314.

As described above, by forming the anti-reflection films on the surfaces of the light path changing element, the light which would be lost by the reflection at the surfaces can be utilized and therefore the illuminance can be improved. Thus, the image projected on the screen can be brighter.

Figure 8:
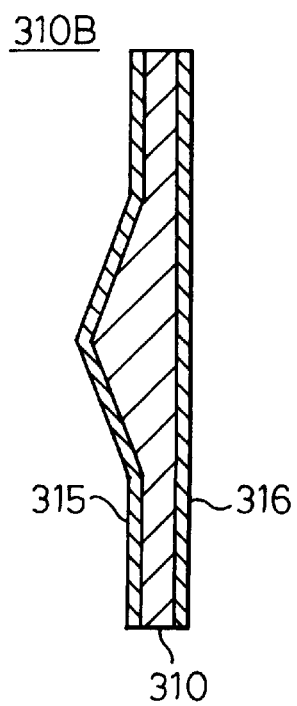
FIG. 8 is a view illustrating a yet further example of the light path changing element.

FIG. 8 shows a further example of a light path changing element according to the invention. The light path changing element 310B shown in FIG. 8 is arranged in place of the light path changing element 31 making up the projection-type display apparatus 30 shown in FIG. 3.

The light path changing element 310B shown in FIG. 8 is equivalent to the light path changing element 310 of FIGS. 5A and 5B having the surfaces thereof formed with a UV (ultraviolet light) cut film and an IR (infrared light) cut film. The UV cut film 315 is formed on the incidence surface side of the light path changing element 310 and the IR cut film 316 is formed on the exit surface side thereof. A well-known UV cut film in general use for optical products can be used as the UV cut film 35. Also, a well-known IR film in general use for optical products can be used for the IR cut film 316.

As described above, by forming a UV cut film and an IR cut film on the surface of the light path changing element, the deterioration of the liquid crystal panel or the polarizing plate or the like arranged with the liquid crystal panel, which would otherwise be caused by the ultraviolet light, can be prevented. Further, the temperature increase in the liquid crystal panel, the polarizing plate or the neighborhood thereof which otherwise might be caused by the infrared light can be suppressed. As a result, the service life of the projection-type display apparatus can be improved and the cooling structure can be simplified, thereby making possible a small, light-weight apparatus.

Also, in FIG. 8, the positions of the UV cut film 315 and the IR cut film 316 (the incidence side and the exit side) can be changed. Such a configuration also can produce a similar function and effect.

Although the light path changing element 310 shown in FIGS. 5A and 5B is an example of the light path changing element formed with the anti-reflection film, the UV cut film and the IR cut film in FIGS. 7 and 8, the invention is not limited to such a light path changing element, but the light path changing elements 310, 320 shown in FIGS. 4A–4B and 6A–6C, and the light path changing elements of other configurations are also applicable with equal functions and effects.

Also, the combination of the anti-reflection film, the UV cut film and the IR cut film is not limited to the configuration of FIGS. 7 and 8, but various combinations are possible. For example, one surface of a light path changing element is formed with an anti-reflection film and the other surface thereof is formed with an UV cut film. As another alternative, an anti-reflection film is formed on one of a light path changing element, and an IR cut film is formed on the other surface. In these configurations, the functions and effects of the respective films can be exhibited as light path changing elements.

Further, a configuration formed with all the films is also applicable. For example, the anti-reflection film and the UV cut film are formed on one surface of a light path changing element, and the anti-reflection film and the IR cut film are formed on the other surface. In this configuration, any one of the two films on each surface of the light path changing element can be formed outside or inside (on the side nearer to the light path changing element) as desired. In such a case, the functions and effects of all the films can be obtained as light path changing elements.

Figure 9:
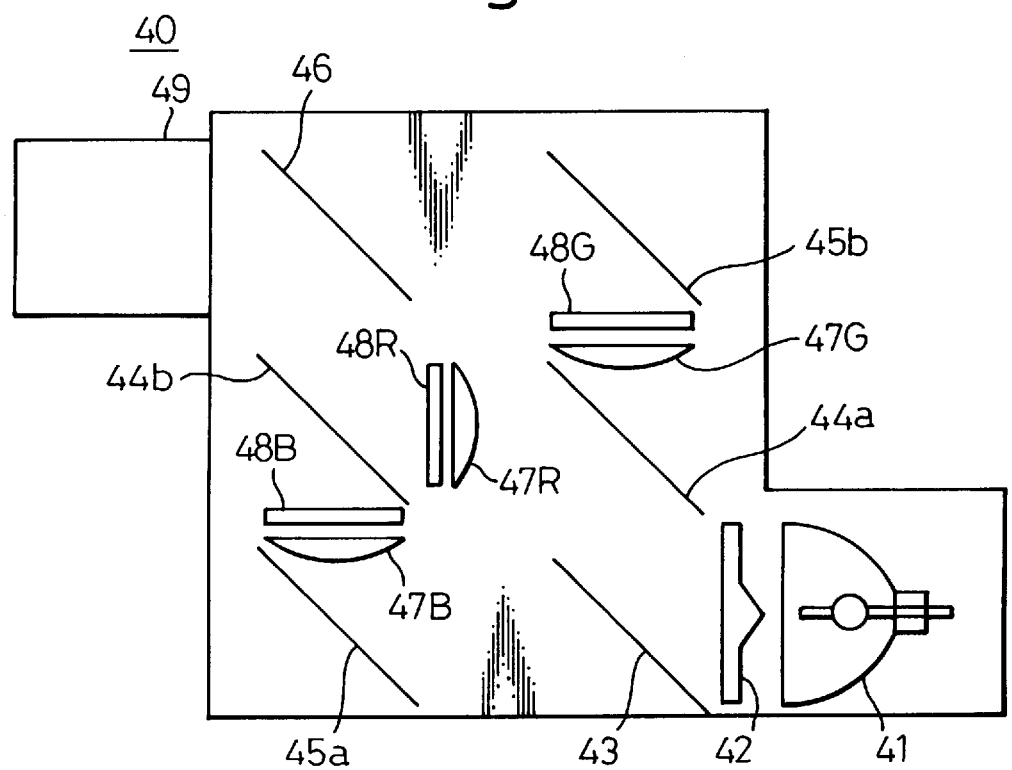
FIG. 9 is a view illustrating the projection-type display apparatus according to the second embodiment of the present invention.

FIG. 9 shows a configuration of a projection-type display apparatus according to the second embodiment of the present invention.

The projection-type display apparatus 40 shown in FIG. 9 is an example application which uses three liquid crystal panels as light modulation elements, and the white color light is separated into three primary color light beams of red (R light or R), green (G light or G) and blue (B light or B). These color light rays are modulated by the liquid crystal panels and combined, and the combined modulated light rays are projected.

The projection-type liquid crystal display apparatus 40 is configured of a light source 41 of a metal halide lamp for emitting a white light, a light path changing element 42, a GR reflection dichroic mirror 43 for reflecting the green light and the red light and allowing the blue light to pass through, R reflection dichroic mirrors 44a and 44b for reflecting the red light and allowing the green light and the blue light to pass through, total reflection mirrors 45a and 45b, a BR reflection dichroic mirror 46 for reflecting the blue light and the red light and allowing the green light to pass through, condenser lenses 47R, 47G and 47B, liquid crystal panels 48R, 48G and 48B for modulating the color light rays, and a projection lens 49.

In this case, the light path changing element 42 is configured in the same manner as if a UV cut film, an IR cut film and an anti-reflection film are formed on the surfaces of the light path changing element 310 shown in FIGS. 5A and 5B. The UV cut film and the anti-reflection film with the latter located outside are arranged on the incidence side of the light path changing element with a prism, and the IR cut film and the anti-reflection film with the latter located outside are arranged on the exit side of the light pass changing element.

The white light emitted by the light source 41 enters the light path changing element, whereby the ultraviolet component and the infrared component are removed therefrom, while the light beams that have entered the prism of the light path changing element 42 exit with the light path thereof changed. The light beams that have exited from the light path changing element 42 have the blue light thereof transmitted through the GR reflection dichroic mirror 43 and the red light and the green light thereof reflected, with the optical axis thereof changed by 90°. The blue light changes its optical axis by 90° at the total reflection mirror 45a and then, after being condensed by the condenser lens 47b, enters the liquid crystal panel 48B. The blue light is modulated in accordance with image signals by the liquid crystal panel 48B, and the modulated blue light exits from the liquid crystal panel 48B. The modulated blue light changes its optical axis by 90° by being reflected from the BR reflection dichroic mirror 46 and proceeds toward the projection lens 49.

In the green light and the red light reflected by the GR reflection dichroic mirror 43, the red light is reflected by the R reflection dichroic mirror 44a change their optical axis by 90°, while the green light passes through. The red light thus reflected is condensed by the condenser lens 47R before entering the liquid crystal panel 48R. The red light is modulated in accordance with image signals by the liquid crystal panel 48R, and the modulated red light exits from the liquid crystal panel 48R. The modulated red light changes its optical axis by 90° by being reflected by the R reflection dichroic mirror 44b, is combined with the blue light, and after changing its optical axis by 90° by being reflected by the BR reflection dichroic mirror 46, proceeds toward the projection lens 49.

The green light passing through the R reflection dichroic mirror 44a is condensed by the condenser lens 47G before entering the liquid crystal panel 48G. The green light is modulated in accordance with image signals by the liquid crystal panel 48G, and the modulated green light exits from the liquid crystal panel 48G. The modulated green light changes its optical axis by 90° at the total reflection mirror 45b, and passes through the BR reflection dichroic mirror 46 and being combined with the blue light and the red light, after which the resulting light proceeds to the projection lens 49.

The combined light that has entered the projection lens 49 is projected onto the screen not shown and forms an image on the screen.

By the way, the condenser lenses 47R, 47G and 47B are arranged adjacently to the liquid crystal panels 48R, 48G and 48B, respectively, in such a manner that the modulated light rays exiting from the liquid crystal panels enter the projection lens 49 efficiently.

Also, according to the embodiment of FIG. 9, a single common light path changing element 42 is arranged between the light source 41 and the GR reflection dichroic mirror 43 for first separating the white light into color light rays. This light path changing element 42 is shared by the three liquid crystal panels 48R, 48G and 48B.

Also with this configuration, the optical relationship between the light source 41, the light path changing element 42 and the liquid crystal panels 48R, 48G and 48G is similar to the relationship between the light source 32, the light path changing element 31 and the liquid crystal panel 33 in FIG. 3, and so is the relationship in respect of the operation and effects.

In other words, since the light path changing element 42 is arranged between the light source 41 and the liquid crystal panels 48R, 48G and 48B, the surfaces (incidence surface) constituting the display areas of the liquid crystal panels 48R, 48G and 48B are irradiated with light with a uniform illuminance distribution and a uniform color distribution.

Consequently, these equalized light beams are modulated by the liquid crystal panels 48R, 48G and 48B, and further combined. The combined modulated light is projected onto the screen not shown by the projection lens 49, so that a bright, superior image with a uniform illuminance distribution and a uniform color distribution is projected on the screen.

Now, according to the embodiment of FIG. 9, the light path changing element 42 is shared as a single light path changing element by the three liquid crystal panels 48R, 48G and 48B. Nevertheless, a light path changing element can be provided for each of the liquid crystal panels 48R, 48G and 48B.

However, the configuration of this embodiment, which has a common light path changing element and is simpler in configuration, makes it possible to reduce the size and weight of the apparatus. Also, each liquid crystal panel is irradiated with light rays with uniform illuminance and color distributions. Thus, when the light rays are combined, the variations from one color to another are eliminated, and the phenomenon disappears in which a specific color of the projected image is stronger than others, thereby producing a superior image.

Figure 10:
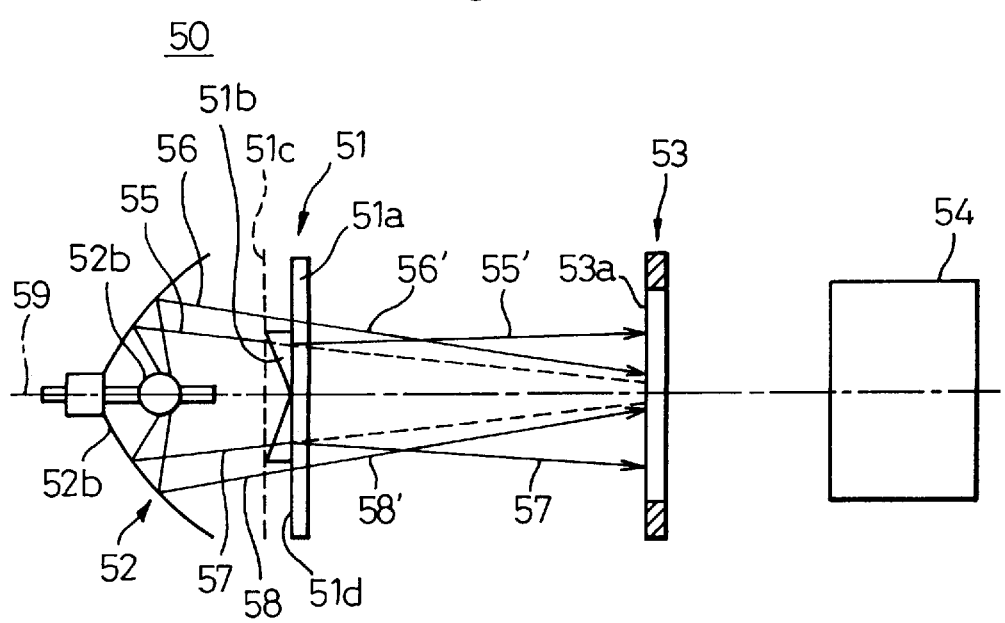
FIG. 10 is a view illustrating the projection-type display apparatus according to the third embodiment of the present invention.

FIG. 10 shows a configuration of a projection-type display apparatus (optical device) according to the third embodiment of the present invention.

The projection-type display apparatus 50 is configured of a light source 52 including a reflector 52a and a light-emitting unit 52b, a liquid crystal panel 53 constituting an object to be irradiated and also a light modulation element 51, a light path changing element 51 arranged between the light source 52 and the liquid crystal panel 53, and a projection lens 54. Also, the light source 52 and the light path changing element 51 make up an optical device according to the present invention.

A well-known transmission-type liquid crystal panel can be used as the liquid crystal panel 53 constituting a light modulation element (object to be irradiated), the light ray emitted by the light source 52 and passing through the light path changing element 51 enters the liquid crystal panel 53. The incident light ray is modulated by the liquid crystal panel 53, and the modulated light ray is projected onto the screen not shown and form an image through the projection lens 54.

The light path changing element 51 includes a recessed central portion with respect to a virtual light flux incidence surface 51c on the light flux incidence side. For example, a transparent base 51a made of a transparent material such as glass or plastic resin has arranged thereon a prism 5b of the same transparent material having a conical recess on the light flux incidence surface 51d. The transparent base 51a and the prism 51b are bonded by an adhesive. The transparent base 51a, the prism 51b and the adhesive are configured of materials having substantially the same refractive index. Also, the light beam entering from the light source 52 is adapted to enter the side of the transparent base 51a where the prism 5b is arranged.

The light-emitting unit 52b of the light source 52 is a discharge-type light-emitting tube in which a pair of electrodes are arranged in opposed relationship to each other on the optical axis. Also, the light source 52 is a discharge lamp of DC energization type. The electrode located in the neighborhood of the apex of the reflector 52b is the anode of this lamp, and the other electrode in opposed relation to the first electrode is the cathode thereof.

The light that has exited from the light-emitting unit 52b is reflected by the reflector 52a and exits from the light source 52. A part of the light ray exited by the light source 52, and travelling toward the central portion of the surface 53a constituting the display area of the liquid crystal panel 53 has the light path thereof changed by the light path changing element 51.

Specifically, the light beams 55 and 57 having a light path proceeding to the central portion of the surface 53a enter the prism 51b of the light path changing element 51, and the light path thereof is changed in the direction away from the optical axis so that the light beams 55' and 57' travel and reach the peripheral portion of the surface 53a on the same side of the optical axis 59. In a similar fashion, the light beams 56 and 58 having a light path proceeding to the central portion of the surface 53a pass through the transparent base 51a of the light path changing element 51 and directly reach the central portion of the surface 53a.

As a consequence, in the projection-type display apparatus 50, the light ray emitted by the light source 52 and irradiating the surface 53a of the liquid crystal panel 53 has a uniform illuminance distribution and a uniform color distribution. Thus, the image projected on the screen (not shown) from the projection-type display apparatus 50 is a superior image having a uniform brightness and free of color irregularities.

Figure 11A:
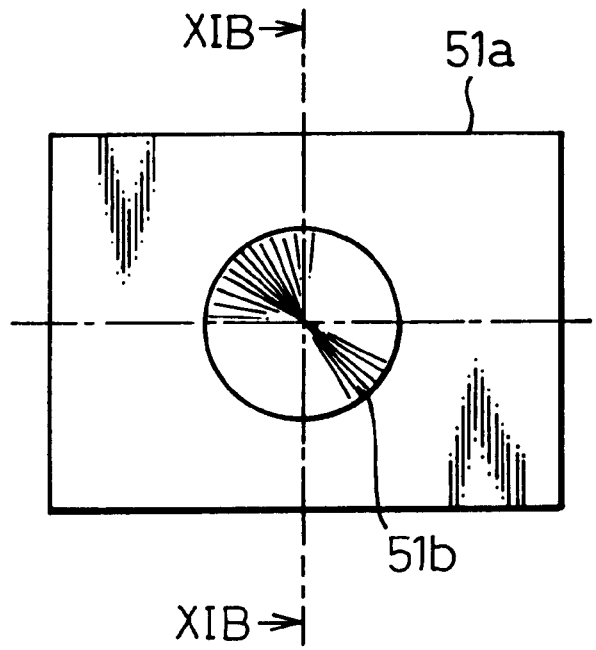
FIGS. 11A and 11B are views illustrating an example of the light path changing element shown in FIG. 10.
Figure 11B:
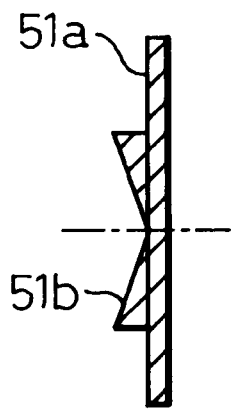

FIGS. 11A and 11B show an example of the light path changing element 51 of FIG. 10. FIG. 11A is a plan view, and FIG. 11B is a cross-sectional view taken along the line XIB—XIB of FIG. 11A.

As shown in FIGS. 11A and 11B, the transparent base 51a is a rectangular flat plate composed of a material such as borosilicate glass and having a longitudinal side of 8 cm, a transverse side of 10 cm and a thickness of 2 mm. The shape of the transparent base 51a is substantially similar to that of the surface 53a constituting the display area of the liquid crystal panel 53, and has a sufficient size, at the position where the light path changing element 51 is arranged, to cover substantially the whole area of the light path emitted by the light source 52. The prism 51b is formed in such a shape that a conical portion is cut out from a cylindrical blank portion to form a conical recess with the slopes extending along the side surface of the cone. The apex located at the bottom of the cone is arranged at the central portion of the transparent base 51a on the optical axis 59, and the bottom surface about the apex as the center is perpendicular to the optical axis 59. Also, the material is a transparent one such as borosilicate glass, with a cross-sectional taper angle $\theta t$ of 4° and a bottom diameter of 4 cm. Also, the transparent base 51a and the prism 51b are optically bonded to each other in such a manner that there is substantially no loss due to the reflection in the interface between the transparent base 51a and the adhesive or in the interface between the prism 51b and the adhesive nor the absorption loss in the adhesive layer.

The shape and size of the prism 51b are designed taking into consideration various factors including the material of the prism 51b and the illuminance and color distributions required for the radiation surface. For example, the angle by which the light path is changed in the prism 51b can be set to 6 to 10°. Also, generally, the larger the prism 51a (the longer the bottom diameter, i.e. the longer the prism length R (see FIG. 2)) or the larger the taper angle (i.e. the larger the angle $\theta t$ (see FIG. 2)), the higher the effect of changing the light path to proceed to the peripheral portion, with the result that the center illuminance is reduced while the illuminance at the peripheral portion is increased.

Figure 12A:
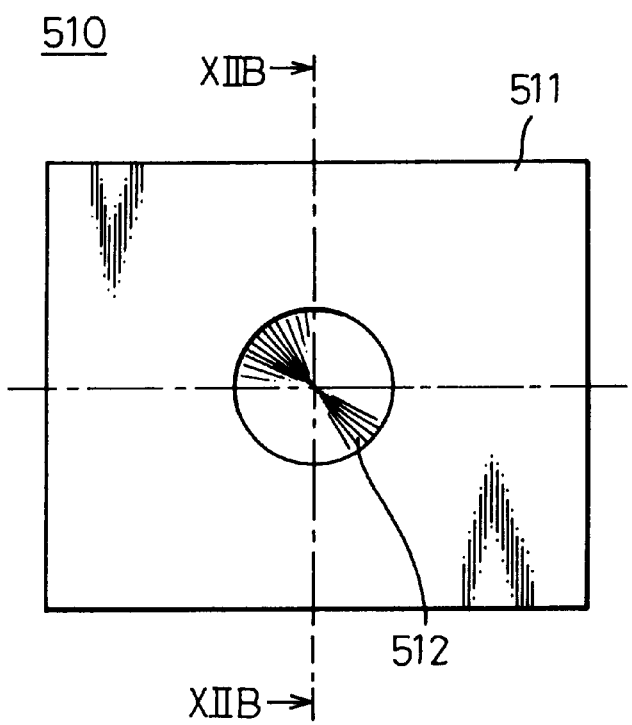
FIGS. 12A and 12B are views illustrating another example of the light path changing element.
Figure 12B:
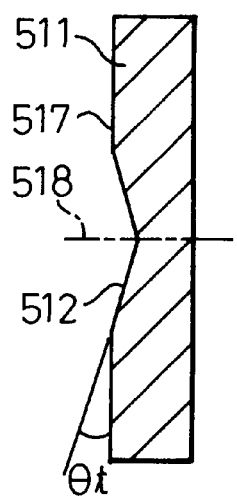

FIGS. 12A and 12B show a further example of a light path changing element according to the embodiment of the invention. FIG. 12A is a plan view, and FIG. 12B is a cross-sectional view taken along the line XIIB—XIIB in FIG. 12A.

The light path changing element 510 shown in FIGS. 12A and 12B is arranged in place of the light path changing element 51 constituting the projection-type display apparatus 50 shown in FIG. 10, and will also be explained with reference to FIG. 10.

The light path changing element 510 includes a transparent base 511 and a prisms 512 integrally formed with each other. A conical recess is formed on the side of the light ray incidence surface 517 of the transparent base 511. Also, the virtual incidence surface 51c in FIG. 10 corresponds to the incidence surface 517 of the transparent base 511. The transparent base 511 and the prism 512 are made of borosilicate glass or the like material. The transparent base 511 is a rectangular flat plate having an outer size with a longitudinal side of 8 cm, a transverse side of 10 cm, and a thickness of 5 mm, and has a shape substantially similar to that of the radiation surface 53a constituting the display area of the liquid crystal panel 53. Also, the transparent base 511 has, at the position where the light path changing element 510 is arranged, a size sufficient to cover substantially the whole area of the light path of the light ray emitted by the light source 52. The prism 512 is conical in shape and located at the central portion of the transparent base 511 in such a manner that the apex thereof is on the optical axis 518 (corresponding to the optical axis 59 in FIG. 10). The material is borosilicate glass and is similar to that of the transparent base 511. The cross-sectional taper angle $\theta t$ is 4°, and the bottom diameter is 4 cm. Also, the light ray from the light source 52 is adapted to enter a side of the prism 512 of the light path changing element 510.

The light path changing element 510 shown in FIGS. 12A and 12B can be easily formed in press or the like, and is superior in production efficiency to the light path changing element 51 of FIGS. 11A and 11B. Also, the light path changing element 510, which is integrally formed, poses no problem of loss unlike the light path changing element 51 of FIGS. 11A and 11B.

Figure 13A:
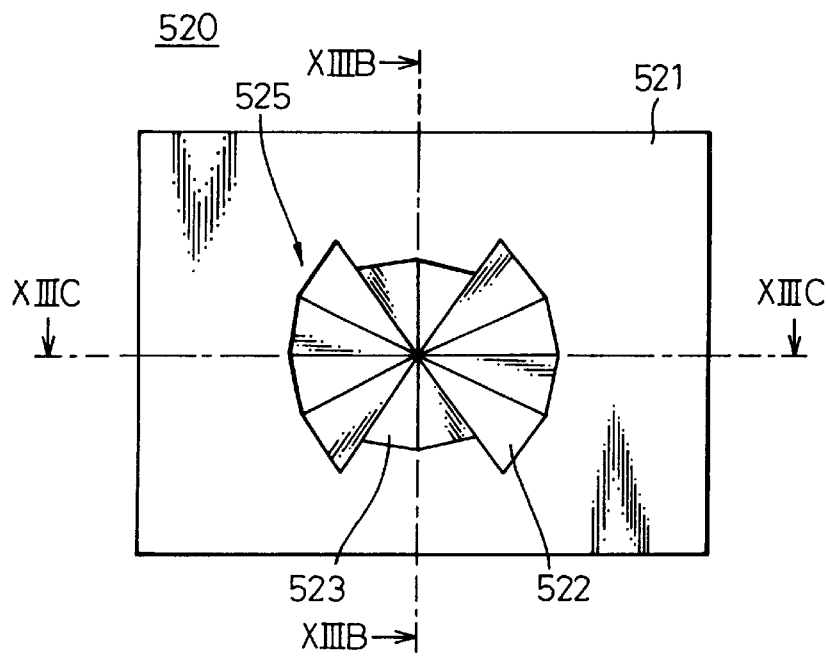
FIGS. 13A to 13C are views illustrating a further example of the light path changing element.
Figure 13B:
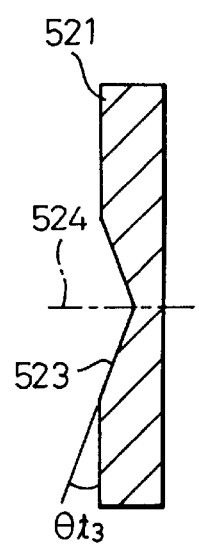
Figure 13C:
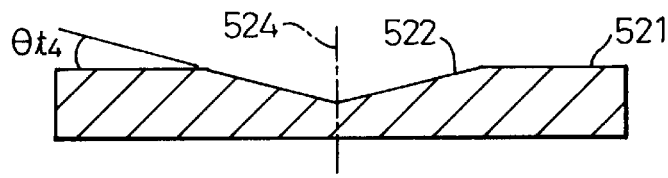

FIGS. 13A to 13C show a further example of a light path changing element according to the embodiment of the present invention. FIG. 13A is a plan view, FIG. 13B is a cross-sectional view taken along the line XIIIB—XIIIB in FIG. 13A, and FIG. 13C is cross-sectional view taken along the line XIIIC—XIIIC in FIG. 13A.

The light path changing element 520 shown in FIGS. 13A to 13C, like the light path changing element 510 shown in FIGS. 12A and 12B, is arranged in place of the light path changing element 51 constituting the projection-type display apparatus 50 shown in FIG. 10.

The light path changing element 520 shown in FIGS. 13A to 13C is identical to the light path changing element 510 of FIGS. 12A and 12B in that the transparent base 521 and the prism 525 are integrally formed with each other, but the prism 525 has a different shape.

The conically recessed prism 525 of the light path changing element 520 is similar in shape to a recessed prism having a polygonal cone. This prism 525 has the shape of a multiplicity of prism surfaces combined, i.e. is a combination of parts of recessed prisms having a plurality of types of polygonal conical slopes of different prism lengths, apex angles and taper angles.

In the prism 525 shown in FIG. 13B, a part of the prism including polygonal conical slopes configured of the prism surface 523 having a taper angle of $\theta t3$ in the cross-section taken along the line XIIIB—XIIIB is arranged symmetrically with respect to the horizontal line XIIIC—XIIIC passing through the optical axis 524 and on either side of the vertical line XIIIB—XIIIB passing through the optical axis 524.

Also, as shown in FIG. 13C, a part of the polygonal conical prism configured of the prism surface 522 forming a taper angle $\theta t4$ in the cross-section taken along the line XIIIC—XIIIC is arranged symmetrically with respect to the vertical line XIIIB—XIIIB passing through the optical axis 524 and on either side of the horizontal line XIIIC—XIIIC passing through the optical axis 524.

The taper angles $\theta t3$ and $\theta t4$ are in such a relationship that $\theta t3$ is larger than $\theta t4$. The prism configured of the prism surface 522 is longer than the prism configured of the prism surface 523. Also, the apexes of the polygonal cones coincide with each other on the optical axis 524.

Therefore, the prism 525 assumes a shape like a rectangle similar to the surface of the liquid crystal panel or the like constituting the object to be irradiated, i.e. the display area having an approximate aspect ratio of 3:4. As a result, the illuminance distribution or the color distribution can be equalized in accordance with the display area of the liquid crystal panel constituting the surface to be irradiated.

Although the example of FIGS. 13A to 13C represents a combination of two types of prism surface shapes, it is possible to achieve a shape of the prism with an aspect ratio nearer to 3:4 by combining more types of shapes of prism surfaces.

As described above, the illuminance distribution or the color distribution can be equalized in accordance with an arbitrary shape of the surface or the like as desired by configuring the prism of a plurality of types of prism surfaces of different taper angles and prism lengths. For example, the aspect ratio can be set to 9:16 or thereabouts.

Figure 14:
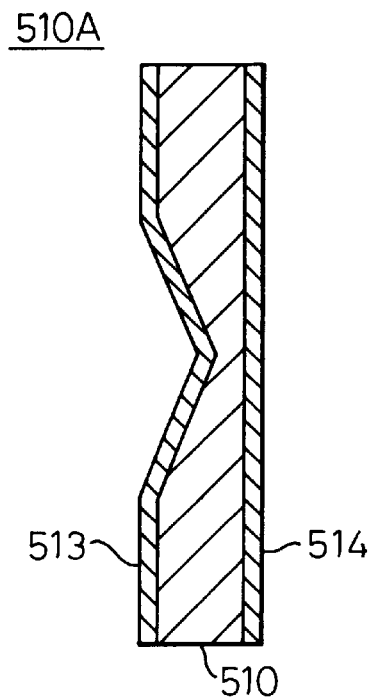
FIG. 14 is a view illustrating a further example of the light path changing element.

FIG. 14 shows a further example of a light path changing element according to the embodiment of the present invention. The light path changing element 510A shown in FIG. 14 is arranged in place of the light path changing element 51 constituting the projection-type display apparatus 50 shown in FIG. 10.

The light path changing element 510A corresponds to the light path changing element 510 of FIGS. 12A and 12B including anti-reflection films formed on the surfaces thereof. Specifically, anti-reflection films 513, 514 are formed on the side of the incidence surface and on the side of the exit surface, respectively, of the light path changing element 510. A well-known film generally used with optical products can be used as the antireflection films 513, 514.

As described above, by forming anti-reflection films on the surfaces of the light path changing element, the light ray that have thus far been lost by the surface reflection can be utilized for an improved illuminance. The image projected on the screen can thus be brightened.

Figure 15:
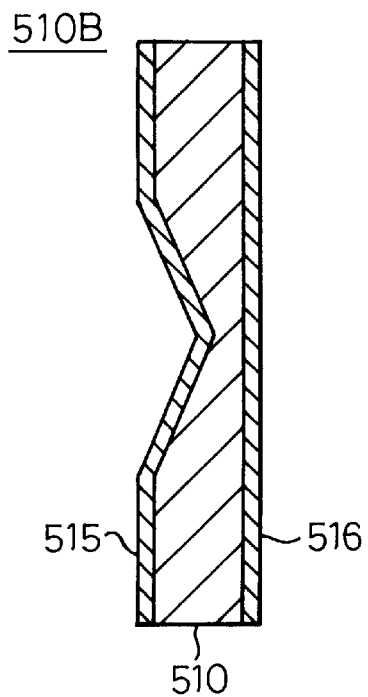
FIG. 15 is a view illustrating a further example of the light path changing element.

FIG. 15 shows a further example of a light path changing element according to the embodiment of the present invention. The light path changing element 510B of FIG. 15 is arranged in place of the light path changing element 51 making up the projection-type display apparatus 50 of FIG. 10.

The light path changing element 510B of FIG. 15 corresponds to the light path changing element 510 of FIGS. 12A and 12B having the surfaces thereof formed with a UV (ultraviolet) cut film and an IR (infrared) cut film. A UV cut film 515 is formed on the incidence surface side of the light path changing element 510, and an IR cut film 516 on the exit surface side thereof. A well known one generally used with optical products can be used as the UV cut film 515. Also, a well-known film in general use with optical products can be used as the IR cut film 516.

As described above, the forming of the UV cut film and the IR cut film on the surfaces of the light path changing element can prevent the deterioration of the liquid crystal panel constituting the object to be irradiated (light modulation element) or the polarizing plate or the like accompanying the liquid crystal panel which otherwise might be caused by the ultraviolet rays. Further, the temperature increase in the liquid crystal panel, the polarizing plate or the neighborhood thereof due to the infrared rays can be suppressed. Furthermore, the cooling structure can be simplified, thereby making it possible to reduce the size and weight of the apparatus.

Also, in FIG. 15, the positions of the UV cut film 515 and the IR cut film 516 can be replaced with each other (between the incidence side and the exit side). Even with such a configuration, a similar function and a similar effect can be obtained.

With reference to FIGS. 14 and 15, the light path changing element 510 shown in FIGS. 12A and 12B was cited as an example of a light path changing element formed with an anti-reflection film, a UV cut film and an IR cut film. The invention, however, is not limited to these light path changing elements, but the light path changing elements 51 and 520 shown in FIGS. 11A–11B and 13A–13C and the light path changing elements of other configurations can be formed with equal function and effect.

Also, the combination of the anti-reflection film, the UV cut film and the IR cut film is not limited to the configuration of FIGS. 14 and 15, but various combinations are possible. For example, an anti-reflection film is formed on one surface of a light path changing film, and a UV cut film on the other surface, or an anti-reflection film is formed on one surface of a light path changing element and an IR cut film on the other surface thereof. In these configurations, the function and effect of the respective films can be obtained as a light path changing element.

Also, all the films can be formed on the surfaces. That is to say, an anti-reflection film and a UV cut film are formed on one surface of a light path changing element and an anti-reflection film and an IR cut film are formed on the other surface thereof. With this configuration, any one of the two films can be formed outside or inside (nearer to the light path changing element) on each surface of the light path changing element as desired. In such a case, the functions and effects of all the films can be obtained as a light path changing element.

Figure 16:
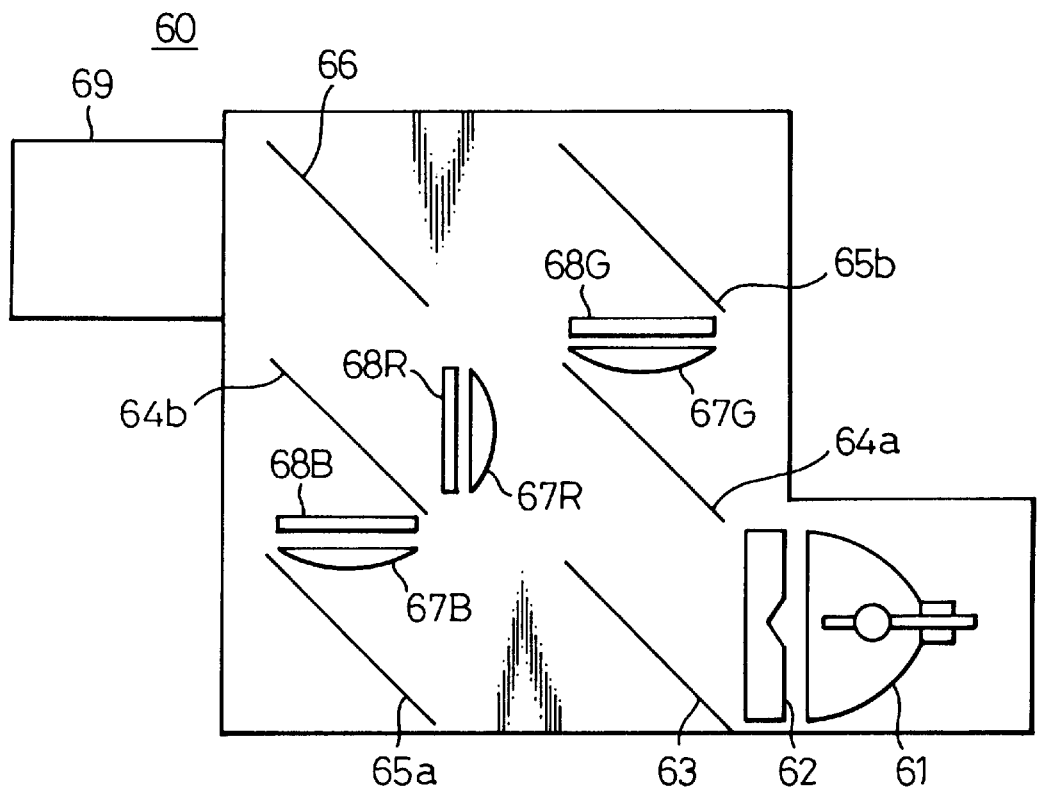
FIG. 16 is a view illustrating the projection-type display apparatus according to the fourth embodiment of the present invention.

FIG. 16 shows a configuration of a projection-type display apparatus according to the fourth embodiment of the present invention.

The projection-type display apparatus 60 shown in FIG. 16 is an example application of a configuration in which three liquid crystal panels are used as light modulation elements, and white light is separated into three primary color light beams of red (R light or R), green (G light or G) and blue (B light or B), which are combined after modulating the color light beams with the liquid crystal panels, and projected as modulated light.

The projection-type liquid crystal display apparatus 60 comprises a light source 61 of a metal halide lamp for emitting the white light, a light path changing element 62, a GR reflection dichroic mirror 63 for reflecting the green light and the red light and allowing the blue light to pass through, R reflection dichroic mirrors 64a and 64b for reflecting the red light and allowing the green light and the blue light to pass through, total reflection mirrors 65a and 65b, a BR reflection dichroic mirror 66 for reflecting the blue light and the red light and allowing the green light to pass through, condenser lenses 67R, 67G and 67B, liquid crystal panels 68R, 68G and 68B for modulating color light beams, and a projection lens 69.

In this configuration, the light path changing element 62 is equivalent to the light path changing element 510 shown in FIGS. 12A and 12B having the surfaces thereof formed with a UV cut film, an IR cut film and an anti-reflection film. The UV cut film and the anti-reflection film are formed on the incidence side having a prism with the anti-reflection film outside, and the IR cut film and the anti-reflection film are formed on the exit side thereof with the anti-reflection film outside.

The white light emitted by the light source 61 enters the light path changing element 62, in which the ultraviolet component and the infrared component are removed, and the light ray that has entered the prism of the light path changing element 62 is emitted with the light path thereof changed. The light ray that has left the light path changing element 62 enters the GR reflection dichroic mirror 63 in which the blue light passes through while the red light and the green light change their optical axis by 90° by being reflected. The blue light, after changing the optical axis thereof by 90° at the total reflection mirror 65a, is condensed by the condenser lens 67b while entering the liquid crystal panel 68B. The blue light is modulated in accordance with image signals at the liquid crystal panel 68B, and the modulated blue light exits from the liquid crystal panel 68B. The modulated blue light changes the optical axis thereof by 90° by being reflected from the BR reflection dichroic mirror 66 and proceeds to the projection lens 69.

The green light and the red light reflected by the GR reflection dichroic mirror 63 change their optical axis by 90° as a result of the red light being reflected by the R reflection dichroic mirror 64a while the green light passes through. The reflected red light is condensed by the condenser lens 67R while entering the liquid crystal panel 68R. The red light is modulated in accordance with image signals by the liquid crystal panel 68R, and the modulated red light exits from the liquid crystal panel 68R. The modulated red light changes its optical axis by 90° by being reflected from the R reflection dichroic mirror 64b, while at the same time being combined with the blue light, and then proceeds to the projection lens 69.

The green light that has passed through the R reflection dichroic mirror 64a is condensed by the condenser lens 67G while entering the liquid crystal panel 68G. The green light is modulated in accordance with image signals by the liquid crystal panel 68G, and the modulated green light exits from the liquid crystal panel 68G. The modulated green light changes its optical axis thereof by 90° at the total reflection mirror 65b, then passes through the BR reflection dichroic mirror 66 while at the same time being combined with the blue light and the red light, and proceeds to the projection lens 69.

The combined light that has entered the projection lens 69 is projected onto the screen, not shown, to thereby form an image on the screen.

By the way, the condenser lenses 67R, 67G and 67B arranged adjacent to the liquid crystal panels 68R, 68G and 68B, respectively, cause the modulated light exiting from the liquid crystal panels to enter the projection lens efficiently.

Also, according to this embodiment, a light path changing element 62 is arranged between a light source 61 and a GR reflection dichroic mirror 63 for first separating the white light into the color light beams, which light path changing element 62 is shared by the three liquid crystal panels 68R, 68G and 68B.

Also in this configuration, the optical relationship between the light source 61 and the liquid crystal panels 68R, 68G and 68B is similar to that between the light source 52, the light path changing element 51 and the liquid crystal panel 53 in FIG. 10, and so is the relationship of the function and the effect thereof.

In other words, since the light path changing element 62 is arranged between the light source 61 and the liquid crystal panels 68R, 68G and 68B, the surfaces (incidence surface) constituting the display area of the liquid crystal panels 68R, 68G and 68B are irradiated with light beams with uniform illuminance distributions and a uniform color distributions.

As a result, the uniform light beams are modulated by the liquid crystal panels 68R, 68G and 68B, and further combined. The combined modulated light is projected onto the screen not shown by the projection lens 69. Thus, the image projected on the screen is a bright and superior image having a uniform illuminance distribution and a uniform color distribution.

In this case, according to the embodiment, the light path changing element 62 is shared by the three liquid crystal panels 68R, 68G and 68B. Alternatively, a light path changing element can be provided for each of the liquid crystal panels 68R, 68G and 68B.

However, the provision of a common light path changing element as in the embodiment simplifies the system configuration more and permits the apparatus to be reduced in size and weight. At the same time, the liquid crystal panels are irradiated with light beams having common uniform illuminance distributions and common uniform color distributions. Therefore, the combined color light beams are free of variations, and the case of the light of a specific color being stronger than the others in the projected image is avoided, resulting in the advantage of producing a superior image.

Figure 17:
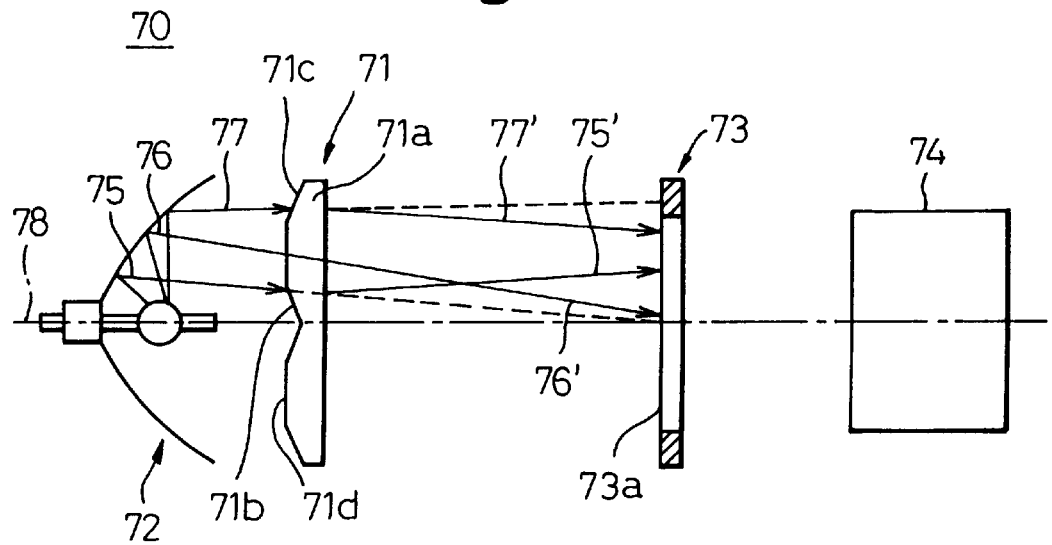
FIG. 17 is a view illustrating the projection-type display apparatus according to the fifth embodiment of the present invention.
Figure 19:
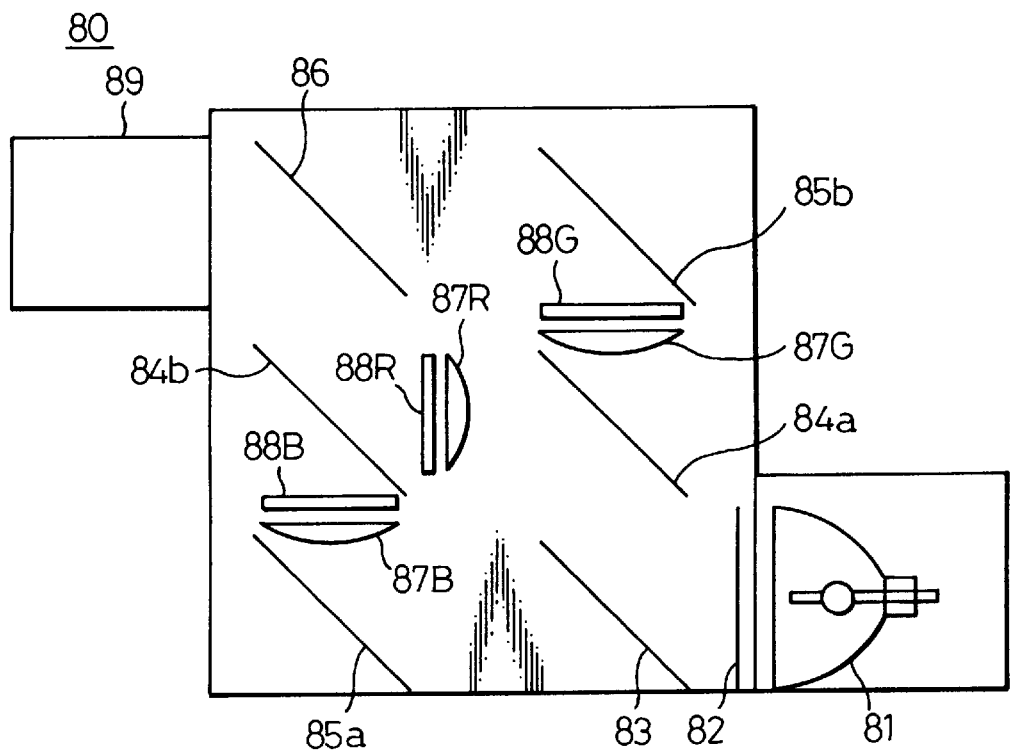
FIG. 19 is a view showing a conventional projection-type liquid crystal display apparatus.
Figure 20:
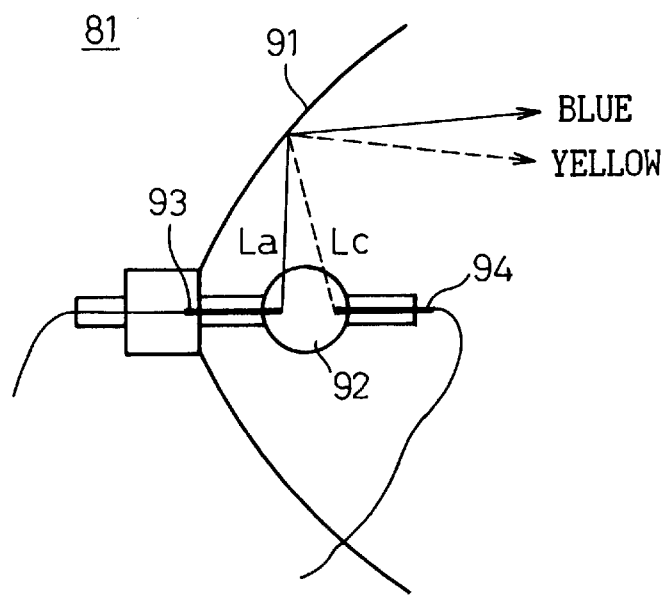
FIG. 20 is a view showing the light source shown in FIG. 19.

FIG. 17 shows a configuration of a projection-type display apparatus (optical device) according to the embodiment of the present invention.

A projection-type display apparatus 70 comprises a light source 72, a liquid crystal panel 73 as a light modulation element constituting an object to be irradiated, a light path changing element 71 arranged between the light source 72 and the liquid crystal panel 73, and a projection lens 74. Also, the light source 72 and the light path changing element 71 make up an optical device according to this invention.

A well-known transmission-type liquid crystal panel can be used as the liquid crystal panel 73 constituting a light modulation element (object to be irradiated), and a light ray emitted by the light source 72 passes through the light path changing element 71 and enters the liquid crystal panel 73. The light ray that has thus entered is modulated by the liquid crystal panel 73, and the modulated light ray is projected onto the screen, not shown, through the projection lens 74 to thereby form an image.

The light path changing element 71 configuring the projection-type display apparatus 70 is analogous to the light path changing element 510 shown in the embodiment of FIGS. 12A and 12B. As compared with the light path changing element 510, the light path changing element 71 is different only in that a prism is formed at the peripheral portion of the light path changing element.

The light path changing element 71 comprises a transparent base 71a and prisms 71b and 71c formed integrally with each other. A conical recess is formed on the side of the light flux incidence surface 71d of the transparent base 71a, and the slope thereof constitutes the prism 71b. Also, there is formed a prism 71c configured of the outwardly directed slopes at the peripheral portion of the transparent base 71a.

The light path changing element 71 changes the light path for a part of the light beam emitted by the light source 72 proceeding to the central portion of the surface 73a constituting the display area of the liquid crystal panel 73.

Specifically, the light ray 75 having a light path proceeding to the central portion of the surface 73a enters the prism 71b of the light path changing element 71, and is transformed into a light ray 75' with the light path thereof changed in the direction away from the optical axis. The resulting light reaches the peripheral portion of the surface 73a on the same side of the optical axis 78. In a similar fashion, the light ray 76 having a light path proceeding to the central portion of the surface 73a passes through the transparent base 71a of the light path changing element 71 and reaches the central portion of the surface 73a directly.

Further, the light path changing element 71 changes the light path of the light ray emitted by the light source 72, which deviates without entering the surface 73a constituting the display area of the liquid crystal panel 73.

Specifically, the light ray 77 having a light path directed toward the outside of the surface 73a of the liquid crystal panel 73 enters the prism 71c of the light path changing element 71, whereby the light path thereof is changed toward the optical axis so that the light ray 77 transforms into a light ray 77', thus reaching the peripheral portion in the radiation surface 73a.

In the projection-type display apparatus 70, therefore, the light ray emitted by the light source 72 and irradiated the surface 73a of the liquid crystal panel 73 has a uniform illuminance distribution and a uniform color distribution. Further, the light ray that has deviated from the surface 73a and has failed to irradiate the surface 73a thus not contributing to the illuminance (brightness) can irradiate the peripheral portion of the radiation surface 73a. The utilization rate of the light ray from the light source is thus improved for a further improvement in the illuminance of the peripheral portion. As a result, the image projected from the projection-type display apparatus 70 onto the screen (not shown) is a bright, superior image having a uniform brightness and is free of color irregularities.

FIGS. 18A and 18B show a light path changing element according to embodiments of the present invention. FIG. 18A shows a light path changing element according to a further embodiment, and FIG. 18B shows a light path changing element according to a yet further embodiment.

The embodiments shown in FIGS. 18A and 18B are configured in such a manner that a single light path changing element includes a combination of prisms, one acting to change a light path to cross the optical axis and the other acting to change the light path in the direction away from the optical axis. The angle by which each of the prisms changes the light path can be set to a value as shown in the aforementioned embodiments.

The light path changing element 710 shown in FIG. 18A and the light path changing element 720 shown in FIG. 18B are arranged in place of the light path changing element 71 constituting the projection-type display apparatus 70 shown in FIG. 17.

The light path changing element 710 is such that a triangular conical prism 710b with the apex thereof located on the optical axis 710f is integrally arranged at and with the central portion of the incidence surface 710e of the transparent base 710a. Also, the peripheral portion of the transparent base 710a is formed with a prism configured of a slope 710c directed from the incident surface 710e outward.

In the light path changing element 710 having the above-mentioned configuration, the prism 710b acts in such a manner that the light path of the light ray proceeding to the central portion of the radiation surface is changed to cross the optical axis 710f thus directing the light ray to the peripheral portion on the opposite side of the optical axis 710f. Also, the prism 710c acts in such a manner as to change the light path of the light beam deviating out of the surface and directs it toward the optical axis 710*f* thus moving it to the peripheral portion of the radiation surface.

Consequently, the projection-type display apparatus using the light path changing element 710 can produce a bright, superior image having a uniform brightness and being free of color irregularities.

Also, in the light path changing element 720, concentric slopes 720*b* and 720*d* constituting recesses are formed on the incidence surface 720*e* of the transparent base 720*a* at equidistant positions from the optical axis 720*f*. These slopes 720*b* and 720*d* form a prism. Also, the peripheral portion of the transparent base 720*a* is formed with a prism constituted of a slope 720*c* directed outward from the incidence surface 720*e*.

In the light path changing element 710 having this configuration, the prism formed of the slope 720*b* acts in such a manner that the light path of the light ray proceeding to the central portion of the surface is changed to cross the optical axis 720*f* and direct it to the peripheral portion on the opposite side of the optical axis 720*f*. Also, the prism formed of the slope 720*d* functions in such a manner that the light path of the light ray proceeding to the central portion of the radiation surface is changed in the direction away from the optical axis 720*f* and directed to the peripheral portion on the same side of the optical axis 720*f*. Further, the prism formed of the slope 720*c* acts in such a manner that the light path of a light ray deviating from the surface is changed and directed toward the optical axis 720*f* thereby moving it to the peripheral surface of the radiation surface.

As a consequence, the projection-type display apparatus using the light path changing element 720 can produce a bright, superior image having a uniform brightness free of color irregularities like that when using the light path changing element 710.

In this way, according to this invention, a single light path changing element can be formed of prisms having different functions and effects which are combined to produce various modifications. The shape of the apparatus, therefore, is not limited to those mentioned above with reference to the embodiments.

The embodiments described above include a liquid crystal panel as a light modulation element. This invention, however, is not limited to such a liquid crystal panel, but any other transmission-type light modulation element is applicable with equal functions and effects.

As described in detail above, in the optical device according to this invention, a light path changing element is arranged between a light source and an object to be irradiated, whereby the light path of the light ray proceeding to the central portion of the radiation surface is changed to proceed toward the peripheral portion of the radiation surface, without changing the parallelism of the light beam. Therefore, the light beam is irradiated from the light source to the surface with a uniform illuminance distribution and a uniform color distribution without reducing the utilization rate of the light ray from the light source.

Also, in the projection-type display apparatus according to the present invention, the configuration of the optical device according to the invention is applied to the projection-type display apparatus using a transmission-type light modulation element. In this way, a bright, superior image having a uniform brightness and being free of color irregularities can be projected on the screen.

What is claimed is:

1. An optical device for irradiating a surface of an object with light, said device comprising:

a light source having an optical axis; and a light path changing element arranged between said light source and said object for changing a light path along which a part of a light beam emitted by the light source travels toward a central portion of the surface of the object into a light path along which said part of the light beam travels toward a peripheral portion of said surface of said object, without changing parallelism of said light beam, said light source emitting light beams to irradiate an area having a first size located about said optical axis at a first distance from the light source, said light path changing element being located about said optical axis at a second distance from the light source and having a second size smaller than said first size so that a part of the light beams emitted by the light source pass through said light path changing element and reach said object, and another part of the light beams emitted by the light source reach said object without passing through said light path changing element.

2. An optical device as set forth in claim 1, characterized in that said light path changing element changes the first light path into the second light path in such a manner that the changed light path crosses the optical axis and the light ray travels toward the peripheral portion of said surface of said object.

3. An optical device as set forth in claim 1, characterized in that said light path changing element changes the first light path into the second light path in such a manner that the changed light path goes away from the optical axis and the light path travels toward the peripheral portion of said surface of said object.

4. An optical device as set forth in claim 1, characterized in that at least one of an antireflection film, an ultraviolet removing film and an infrared removing film is formed on the surface of said light path changing element.

5. An optical device as set forth in claim 1, characterized in that said light path changing element comprises a transparent prism.

6. An optical device as set forth in claim 1, characterized in that said light path changing element comprises a transparent plate having a first size and a transparent prism having a second size smaller than the first size and integrally formed on one side of said transparent plate.

7. An optical device as set forth in claim 6, characterized in that said transparent prism is formed in a conical shape.

8. An optical device as set forth in claim 6, characterized in that said transparent prism is formed in a polygonal pyramidal shape.

9. An optical device as set forth in claim 6, characterized in that said transparent prism is formed in a polygonal pyramidal shape having different flat surface components.

10. An optical device as set forth in claim 1, characterized in that said light path changing element comprises a transparent plate having a prism shaped recess in one surface thereof.

11. An optical device as set forth in claim 10, characterized in that said prism-shaped recess is formed in a conical shape.

12. An optical device as set forth in claim 10, characterized in that said prism-shaped recess is formed in a polygonal pyramidal shape.

13. An optical device as set forth in claim 10, characterized in that said prism-shaped recess is formed in a polygonal pyramidal shape having different flat surface components.

14. A projection-type display apparatus comprising:

a light source having an optical axis; and at least one light modulation element for modulating the light emitted by the light source;

a projection lens for projecting the modulated light; and a light path changing element arranged between said light source and said at least one light modulation element for changing a light path along which a part of a light beam emitted by said light source travels toward a central portion of a display are of said light modulation element into a light path along which said part of the light beam travels toward a peripheral portion of said display area, without changing the parallelism of said light beam, said light source emitting light beams to irradiate an area having a first size located about said optical axis at a first distance from the light source, said light path changing element being located about said optical axis at a second distance from the light source and having a second size smaller than said first size so that a part of the light beams emitted by the light source pass through said light path changing element and reach said object, and another part of the light beams emitted by the light source reach said object without passing through said light path changing element.

15. A projection-type display apparatus as set forth in claim 14, further comprising a color separating optical system for separating the light emitted from the light source into the three primary color light beams, three light modulation elements included in said at least one light modulation element for modulating the three primary color light beams, respectively, and a color combining optical system for combining said modulated three primary color light beams.

\* \* \* \* \*